United States Patent Office 2,943,003
Patented June 28, 1960

2,943,003

PROCESS FOR THE CONCENTRATION OF SUGAR SOLUTIONS

Marco Itin, Trins, Graubunden, Fritz Conradin, Tamins, Graubunden, and Johann Giesen, Haldenstein, near Chur, Graubunden, Switzerland, assignors to Inventa A.G. fuer Forschung und Patentverwertung, Zurich, Switzerland No Drawing. Filed Feb. 27, 1958, Ser. No. 717,835

6 Claims. (Cl. 127—46)

This invention relates to a process for the concentration of sugar solutions by means of adsorption by anion exchangers.

It is known that sugar can be adsorbed onto anion exchangers from aqueous solutions. It can happen, however, that the adsorbed sugar during this process is epimerized and degraded. If a glucose-anion exchanger complex is treated, shortly after its formation, with an aqueous carbonic acid solution, the glucose again separates from the exchanger. If the exchanger acts upon the glucose for a prolonged period of time, the glucose epimerizes, degrades and cannot be recovered.

It now has been found that aqueous sugar solutions can be concentrated by the following method:

The sugar is adsorbed from the solution onto anion exchangers, the exchanger separated from the solvent, the sugar is desorbed rapidly after adsorption with gaseous $CO_2$, and the sugars clinging to the exchangers are removed from the latter with an amount of solvent which is less than that of the original solvent.

Suitable anion exchangers are, e.g., polystyrenes having quaternary ammonium groups, such as Amberlite IRA–410 (registered trademark). The process according to the present invention is of particular advantage for the concentration of aqueous glucose solutions. In one embodiment, a dilute glucose solution flows through a tower filled with an anion exchanger. The latter adsorbs the glucose quantitatively until saturation has been attained, i.e., until the solution, after passing through the tower, again contains glucose. From that time on, the anion exchanger still adsorbs a part of the glucose until practically full exchange capacity is reached, i.e., until the glucose solution, after passing the tower, has practically the same concentration as before passing through the tower. The full exchanger capacity must be ascertained for each exchanger, it being an empirical value. For most commercial anion exchangers, e.g., Amberlite IRA–410, this value is approximately 40–60 percent of the theoretical adsorption capacity. The latter can be determined by calculating the amount of active group equivalents per weight unit. For the execution of the process according to the present invention, loading of the anion exchanger to its full capacity is not required.

The partially or fully loaded exchanger is separated from the solvent, which is easily accomplished by allowing the solvent to flow out of the tower without introducing new solution. For the subsequent desorption it is not required that the anion exchanger be completely dry. However, it is necessary to carry out desorption promptly after adsorption, since prolonged action of the exchanger upon the glucose leads to its degradation. The glucose is desorbed by rinsing of the exchanger column with gaseous $CO_2$. Hereby, elevated pressures, of approximately 5–20 atmospheres, are applied when the exchanger is not dry, i.e., if solvent still is present. If the exchanger is at least partly dry, atmospheric pressure will suffice. The glucose is desorbed by the treatment with $CO_2$ and now adheres to the surface of the exchanger, wherefrom it can be removed simply by rinsing with water. In order to effect a concentration, less water is employed than was present in the original solution. The amount of water preferably is limited to the quantity required for wetting the entire surface of the anion exchanger. This is approximately one-third of the volume of the exchanger. In this manner, 50 to 80 percent of the desorbed glucose can be removed from the exchanger. The remainder is separated with larger quantities of water and is concentrated in a known manner. The method enables a concentration of a solution containing originally 1 percent glucose to over 20 percent.

Instead of glucose solutions, those containing other sugars may be so treated, e.g. fructose, xylose and similar solutions.

The anion exchangers whose basic groups had been converted into carbonate groups during the process, are regenerated in a known manner, by rinsing with alkali.

The concentration process, as described, can be made continuous by using a plurality of exchanger columns which alternately are loaded and unloaded.

The process according to the invention will now be further explained by the following examples. However, it should be understood that these are given merely by way of illustration, not of limitation, and that many changes in the details are possible without departing from the spirit of the invention.

*Example 1*

A pure, aqueous solution containing 3.7 percent glucose is allowed to flow at room temperature through a tower containing 2 liters of activated, wet anion exchanger Amberlite IRA–410 (registered trademark). Throughput speed is approximately 2.5 liters per hour. After 3.25 l. solution have passed the tower, the water emerging at the bottom again contains glucose, i.e., the capacity of the exchanger has been reached. This is approximately 70 percent of the full practical capacity which is 4.64 l. of 3.7 percent solution or 0.171 kg. glucose. After 4.64 l. glucose solution have passed through the exchanger column, the solution flowing out at the bottom has the same concentration as the one added originally at the top, and the anion exchanger is fully loaded. In the example at hand, the full practical capacity of the exchanger is approximately 50 percent of the theory. The loaded anion exchanger is separated from the solution by allowing the latter to flow off, and is rinsed, in a practically dry state, with gaseous $CO_2$ for approximately 1.5 hours under normal pressure. After that, 0.66 l. water are run through the tower, whereby 68 percent of the glucose are recovered in form of a 17.6 percent solution. The remaining 32 percent glucose are recovered with approximately 2 liters of water, and the 2.75 percent solution can be concentrated in a known manner.

*Example 2*

Two liters activated and wetted anion exchanger Amberlite IRA–410 are inserted in a pressure pipe and are loaded at room temperature with a 17 percent, pure aqueous glucose solution. The throughput speed is 2.5 l./h. Loading of the exchanger is terminated when the outflowing solution has equal sugar content as the inflowing sugar solution. No further solution is added, and the fully wetted exchanger is treated in the pressure pipe for one hour with $CO_2$ at a pressure of 9 atmospheres. The temperature is 40° C. A 33 percent glucose solution adheres to the exchanger. This solution is drained off, and the remaining sugar is washed off the exchanger. The $CO_2$ bonded to the resin is removed by washing with formic acid and is recovered. The exchanger is reconverted into its OH-form with dilute sodium hydroxide, The exchanger, present in its carbonate form, can also be regenerated by washing with alkali.

What we claim is:

1. A process for the concentration of sugar solutions comprising the adsorption of sugar from its solution onto an anion exchanger, separation of said exchanger from the solvent, desorption of said sugar rapidly following adsorption by rinsing with gaseous $CO_2$, and removal of said sugar adhering to said exchanger with an amount of solvent which is less than the amount of the original solution.

2. The process according to claim 1, wherein the sugar is desorbed from said anion exchanger which is at least partly dry by means of $CO_2$ at normal pressure.

3. The process according to claim 1, wherein the sugar is desorbed from said anion exchanger which is wet by means of $CO_2$ at elevated pressures, such pressures ranging from 5 to 20 atmospheres.

4. The process according to claim 1, wherein aqueous solutions are concentrated.

5. The process according to claim 1 wherein glucose solutions are concentrated.

6. The process according to claim 1, wherein the concentration is carried out continuously.

References Cited in the file of this patent

UNITED STATES PATENTS

| | | |
|---|---|---|
| 2,561,695 | Gustafson | July 24, 1951 |
| 2,568,925 | Mills | Sept. 25, 1951 |
| 2,684,331 | Bauman | July 20, 1954 |
| 2,785,998 | Harding | Mar. 19, 1957 |

OTHER REFERENCES

Archives of Biochem. and Biophysics, art. by Roseman, vol. 36, 1952, pp. 232, 233.

Nature: art. by Woolf, vol. 171, May 9, 1953, p. 841.